(12) United States Patent
Bartoli et al.

(10) Patent No.: US 10,093,478 B2
(45) Date of Patent: Oct. 9, 2018

(54) CAPSULE AND DISPENSING MACHINE FOR BEVERAGES

(71) Applicant: Sarong Societa' per Azioni, Reggiolo (IT)

(72) Inventors: Andrea Bartoli, Reggio Emilia (IT); Davide Capitini, Reggio Emilia (IT)

(73) Assignee: Sarong Societa' per Azioni (IT)

( * ) Notice: Subject to any disclaimer, the term of this patent is extended or adjusted under 35 U.S.C. 154(b) by 636 days.

(21) Appl. No.: 14/394,631

(22) PCT Filed: Apr. 16, 2013

(86) PCT No.: PCT/IB2013/053018
§ 371 (c)(1),
(2) Date: Oct. 15, 2014

(87) PCT Pub. No.: WO2013/156932
PCT Pub. Date: Oct. 24, 2013

(65) Prior Publication Data
US 2015/0068405 A1    Mar. 12, 2015

(30) Foreign Application Priority Data

Apr. 17, 2012 (IT) .............................. MO2012A0095
Apr. 17, 2012 (IT) .............................. MO2012A0096

(51) Int. Cl.
*B65D 25/08* (2006.01)
*B65D 85/804* (2006.01)
(Continued)

(52) U.S. Cl.
CPC ...... *B65D 85/8043* (2013.01); *A47J 31/0668* (2013.01); *A47J 31/369* (2013.01); *A47J 31/407* (2013.01); *B65D 81/3211* (2013.01)

(58) Field of Classification Search
CPC ............. B65D 81/3211; B65D 85/8043; A47J 31/0668; A47J 31/369; A47J 31/407
(Continued)

(56) References Cited

U.S. PATENT DOCUMENTS 3,404,811 A * 10/1968 Cernei ............... B65D 81/3211
206/222
3,946,903 A * 3/1976 Parker .................... B29C 49/48
215/900

(Continued)

FOREIGN PATENT DOCUMENTS

| JP | 08310531 | 11/1996 |
|---|---|---|
| WO | 2005077811 A2 | 8/2005 |
| WO | 2012004430 A1 | 1/2012 |

*Primary Examiner* — Luan K Bui
(74) *Attorney, Agent, or Firm* — Laubscher & Laubscher, P.C.

(57) ABSTRACT

A capsule includes a first container provided with a first closed cavity containing a first product and a second container provided with a second closed cavity containing a second product. The first container and the second container include a first interface element facing the first cavity and a second interface element facing the second cavity, respectively. The first interface element is provided with a first connecting device having a first conduit and the second interface element is provided with a second connecting device having a second conduit. In an assembled configuration of the capsule, in which the first container is associated with the second container, the first connecting device is engaged with the second connecting device so as to couple the first conduit with the second conduit to make a flow connection between the first cavity and the second cavity and enable at least the first product to pass into the second cavity and join the second product to make a final product.

14 Claims, 4 Drawing Sheets

(51) Int. Cl.
*A47J 31/06* (2006.01)
*A47J 31/36* (2006.01)
*B65D 81/32* (2006.01)
*A47J 31/40* (2006.01)

(58) Field of Classification Search
USPC ....... 206/219–222, 568; 215/DIG. 8; 99/295, 99/323; 426/115
See application file for complete search history.

(56) References Cited

U.S. PATENT DOCUMENTS

| | | | | |
|---|---|---|---|---|
| 4,994,029 | A | * | 2/1991 | Rohrbough ......... A61M 5/2429 206/222 |
| 5,353,961 | A | * | 10/1994 | Debush .................. B65D 25/08 206/221 |
| 6,527,110 | B2 | * | 3/2003 | Moscovitz ......... B65D 51/2835 206/222 |
| 7,066,323 | B1 | * | 6/2006 | Reisman ............. B01F 15/0205 206/222 |
| 2006/0049127 | A1 | * | 3/2006 | Katz .................. B65D 81/3211 215/DIG. 8 |
| 2006/0254936 | A1 | * | 11/2006 | Corbitt ............... B65D 81/3211 206/219 |
| 2006/0289316 | A1 | * | 12/2006 | Henry ................ B65D 81/3211 206/219 |
| 2007/0259074 | A1 | | 11/2007 | Searchilli et al. |
| 2008/0179334 | A1 | * | 7/2008 | Abramson ............ B01F 13/002 220/568 |
| 2008/0289976 | A1 | | 11/2008 | Henry |
| 2010/0154459 | A1 | | 6/2010 | Skalski et al. |
| 2010/0154644 | A1 | | 6/2010 | Skalski et al. |
| 2011/0045144 | A1 | | 2/2011 | Boussemart et al. |

\* cited by examiner

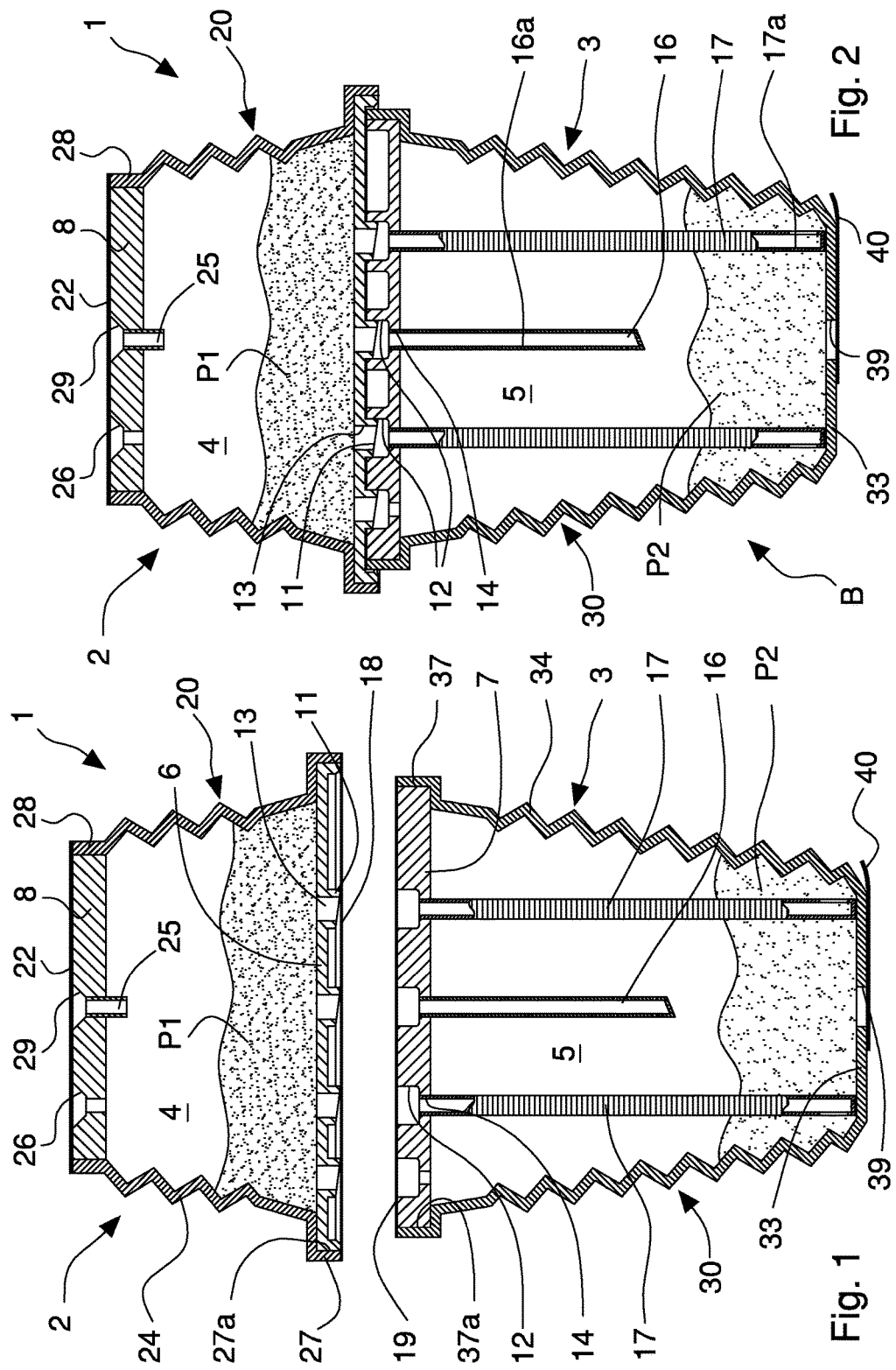

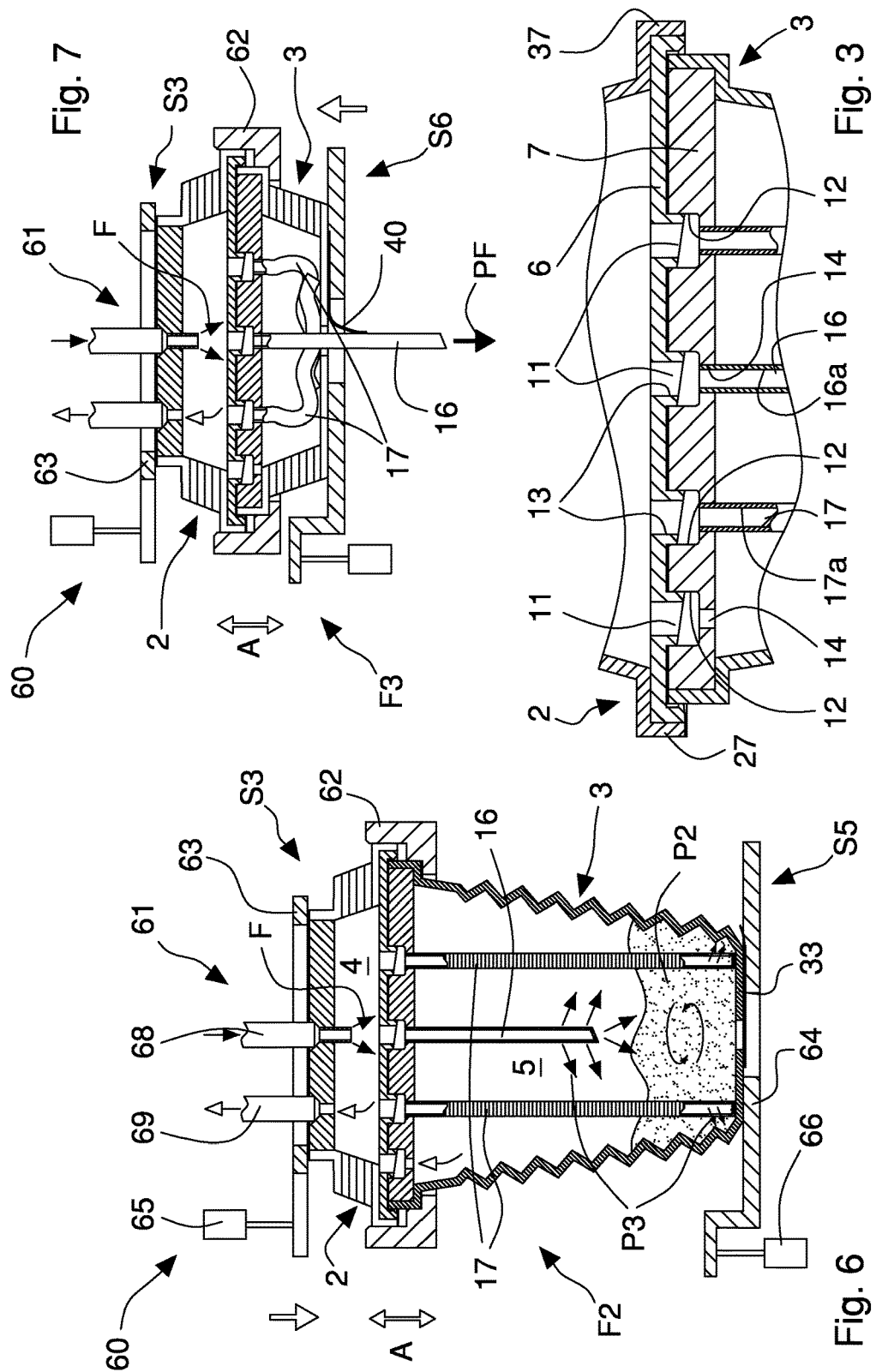

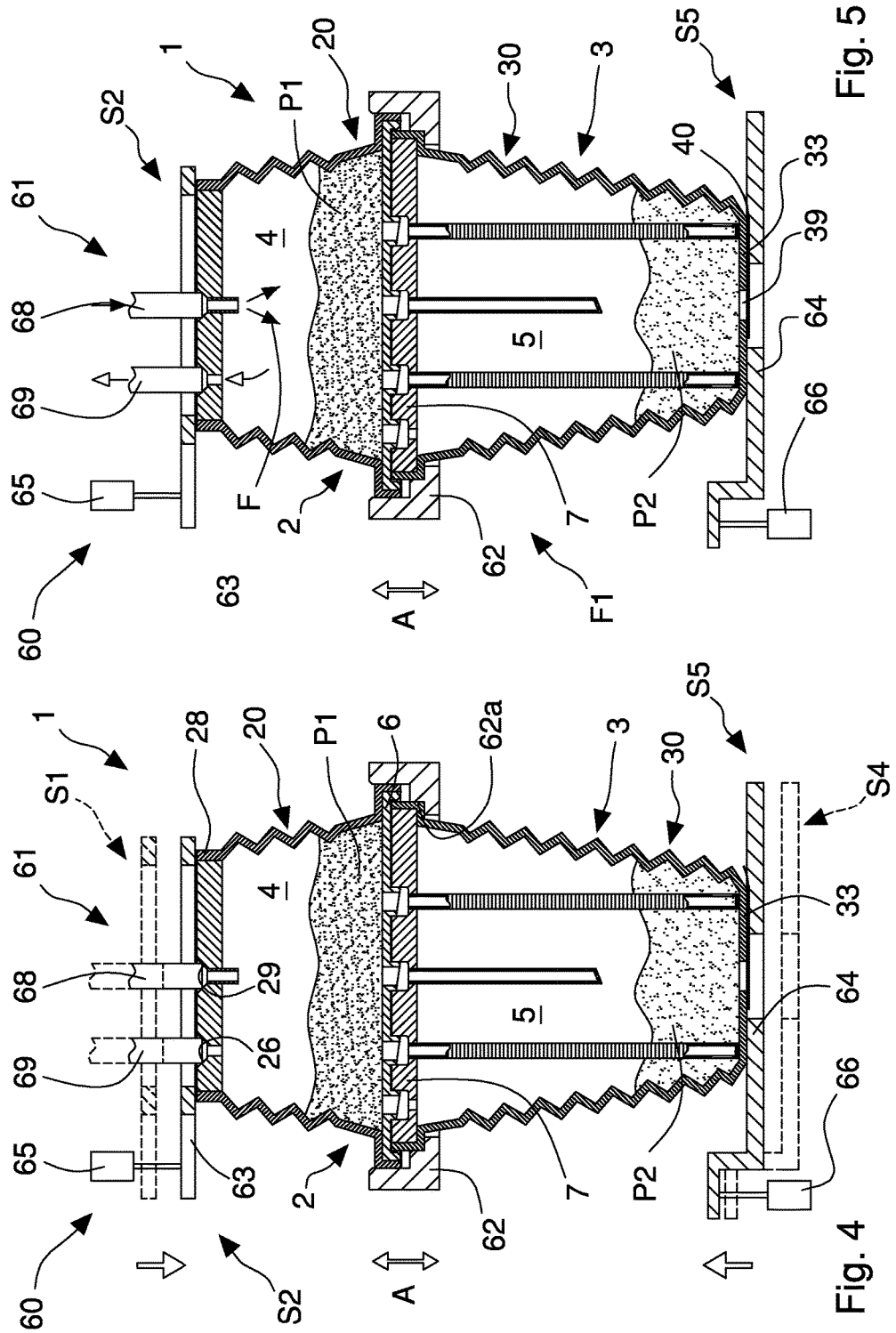

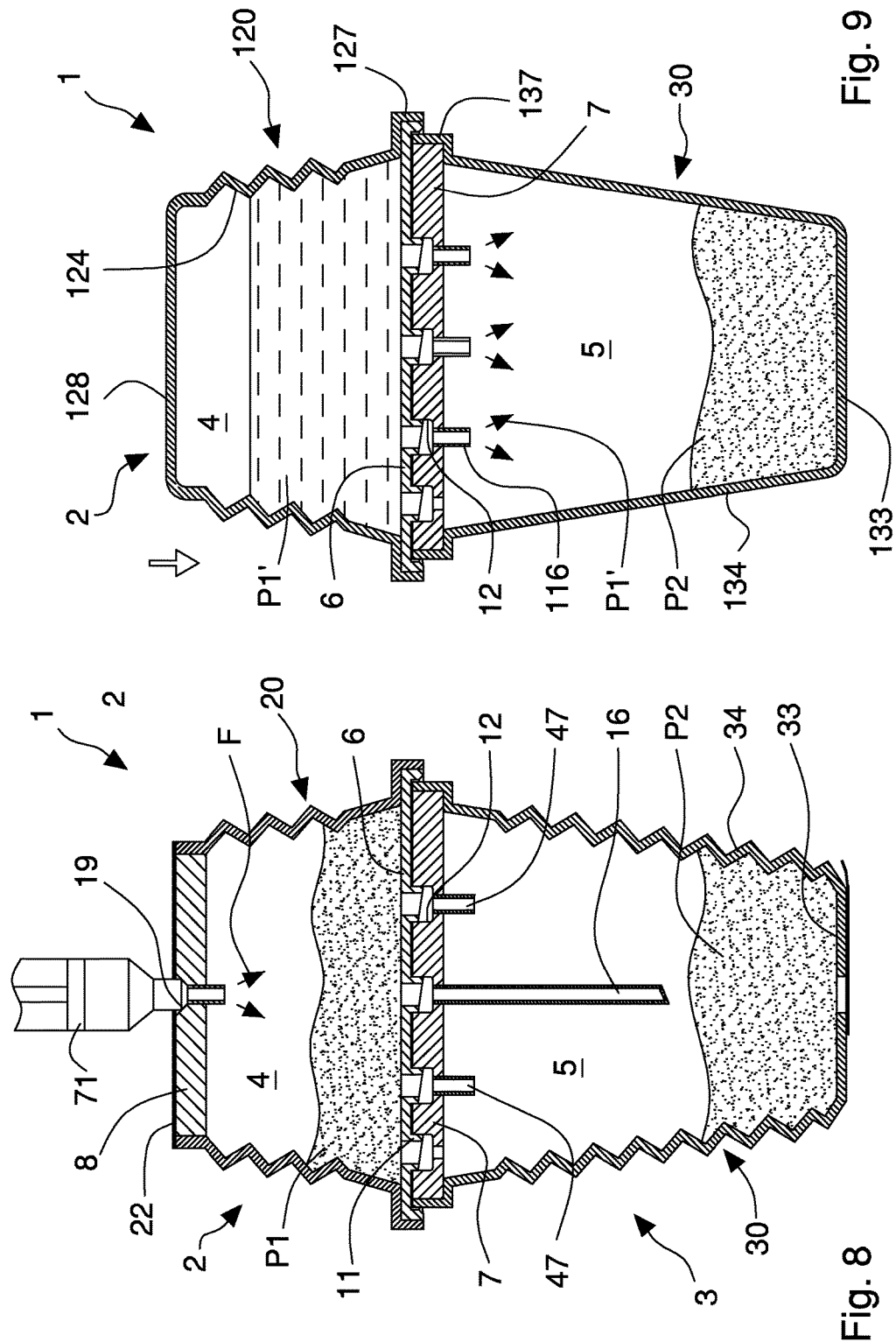

CAPSULE AND DISPENSING MACHINE FOR BEVERAGES

This application is a § 371 Nation Stage Entry of PCT International Application No. PCT/IB2013/053018 filed Apr. 16, 2013. PCT/IB2013/053018 claims priority to IT Application Nos. MO2012A000095 and MO2012A000096, both filed Apr. 17, 2012. The entire contents of these applications are incorporated herein by reference.

The invention relates to capsules or containers for preparing food, pharmaceutical, cosmetic products, and in particular it relates to a modular capsule formed by two containers coupleable to one another and containing respective initial products to be joined together and optionally to a fluid to make a final product.

The invention further relates to dispensing machines suitable for producing a food, pharmaceutical, cosmetic product by using disposable and single-dose capsules containing a soluble or percolable or concentrated product. In particular, the invention relates to a dispensing machine capable of using a modular capsule formed by two containers coupleable to one another and containing respective initial products to be joined together, and optionally to a fluid, to make a final product.

The known capsules typically used in dispensing machines for dispensing food products, for example beverages, are single, disposable, and single-dose containers including an outer casing, made of liquid- and gas-impermeable plastic material and having the shape of a glass or a cup. In particular, the casing has a bottom wall and a side wall defining an upper opening through which the product from which the beverage can be obtained can be inserted. The upper opening is hermetically closed by a cover, typically an aluminium or plastic film sheet, so as to seal the product within the container. The capsule is perforable to allow the insertion of a pressurized liquid, typically water in liquid form, and the outflow of the obtained beverage. In particular, the cover and the bottom wall of the casing are perforable by a suitable device of a dispensing machine, in which the capsule is inserted, to allow pressurized liquid to be inserted from the top and withdrawn from the bottom of the casing, respectively, or vice versa.

Recently, the request by consumers of beverages, such as coffee, chocolate, tea, barley, etc., has increased, which beverages can be flavored as required by inserting suitable flavoring substances.

The flavoring substances can be introduced successively to the preparation of the "base" beverage, by the dispensing machine. However, such a manual procedure is neither convenient nor easy for the final user, and it further provides a flavored final beverage with organoleptic characteristics that are sometimes unsatisfactory, for example, for the partial or uneven mixing carried out by the user.

In order to obviate such a drawback, capsules have been made, containing initial products to be joined to the pressurized fluid, already mixed with respective flavoring substances, said capsules being directly usable in automatic dispensing machines. However, the combination of the initial products and the flavoring substances is very high and, in order to meet tastes and requests by the consumers, a wide range of capsules is necessary. This involves high purchasing costs and a suitable space for receiving and storing such a wide range.

The use is known, above all in the pharmaceutical field, of products in a freeze-dried or powdery form, which have to be rehydrated or solubilized, or anyhow combined with a liquid, typically water, before oral administration. Such initial products are generally packaged in containers sufficiently large to contain the necessary amount of liquid, which has to be manually introduced by the user. However, such manual operation is relatively industrious and easily susceptible to errors, especially in the case of a not very skilled and handy user. The latter can, in fact, add an excessive or insufficient amount of liquid, thus obtaining a non-optimal final product. Furthermore, the liquid insertion procedure may bring the latter and/or the initial product in contact with external elements or materials that may contaminate or pollute the final product.

Documents US 2008/179334, US 2008/289976, WO 2012/004430, and JP 8310531 disclose a capsule according to the prior art.

Documents US 2007/259074, US 2011/045144, and US 2010/154644 disclose a dispensing machine for a capsule according to the prior art.

An object of the present invention is to improve the known capsules, in particular sealed, single-dose and disposable capsules containing a first initial product to be joined to a second initial product and/or to a fluid, to prepare a corresponding final product, in particular in an automatic dispensing machine.

Another object is to obtain a capsule that allows, in a use step, putting two initial products, selectable as required by the user, in contact, optionally to be joined to a fluid to obtain a final product, in particular a flavored beverage, in a dispensing machine, automatically without any intervention by the user.

A further object is to obtain a capsule that allows combining, at the time of use, two initial products in a simple and rapid manner, while preserving the integrity and hygiene thereof.

Still another object of the present invention is to improve the known dispensing machines suitable to use disposable and single-dose capsules containing an initial product to be joined to a fluid to prepare a corresponding final product, in particular, a beverage.

Another further object is to obtain a dispensing machine capable of receiving and using a modular capsule formed by two containers coupleable to one another and containing respective initial products to be joined together, and optionally to a fluid, to obtain a final product.

Still a further object is to obtain a dispensing machine capable of receiving and using a plurality, of capsules having different sizes and/or initial products to obtain automatically respective final products.

Another object is to make a dispensing machine ensuring the hygiene and cleanliness of the dispensing process, while maintaining the integrity of the organoleptic properties of the final product.

In a first aspect of the invention, there is provided a capsule.

In a second aspect of the invention, there is provided a dispensing machine.

The invention will be better understood and implemented with reference to the appended drawings, which illustrate some exemplary, non-limiting embodiments thereof, in which:

FIG. 1 is a schematic cross-section of the capsule according to the invention in a detached condition;

FIG. 2 is a schematic cross-section of the capsule of FIG. 1 in an assembled condition;

FIG. 3 is an enlarged partial section of the capsule in FIG. 2 highlighting in particular the interface elements;

FIGS. 4 to 7 are cross-sectional views of the capsule in FIG. 2 associated with the dispensing machine of the invention in different successive operating configurations;

FIG. 8 is a schematic cross-section of a version of the capsule of FIG. 1;

FIG. 9 is a cross-section of another version of the capsule of FIG. 1.

With reference to the FIGS. 1 to 7, the capsule 1 according to the invention is illustrated, usable in a dispensing machine 60 according to the invention and described herein below, to produce, by the injection of a pressurized fluid therein, a food final product, for example, a flavored beverage, such as coffee, barley, infusion, tea, chocolate, etc.

As better explained in the following of the description, the capsule 1 can also be used directly by a user without the use of a dispensing machine.

The capsule 1 of the invention comprises a first container 2 provided with a first cavity 4 suitable for containing a first product P1 and a second container 3 provided with a second cavity 5 suitable for containing a second product P2.

The initial products P1, P2 are percolable or soluble or for infusion or freeze-dried or dehydrated products.

The capsule 1 is also suitable for containing initial products to be combined, alone or with a fluid, to obtain a final product, also a non-food product, for example a pharmaceutical, phytosanitary, cosmetic, or detergent product, or generically, a chemical product.

In the following of the description, by final product will be meant, by way of exemplary, non-limiting example, a food product, typically a beverage.

The first container 2 includes a first interface element 6 facing the first cavity 4 and is provided with a first connecting device 11, and the second container 3 includes a second interface element 7 facing the second cavity 5 and is provided with a second connecting device 12.

The interface elements 6, 7 are coupleable to one another in an assembled configuration B of the capsule 1, in which the first container 2 is connected to the second container 3. In particular, the first connecting device 11 engages with and connects to the second connecting device 12 to open the containers 2, 3 and establish a flow connection between the first cavity 4 and the second cavity 5 to allow a fluid F inserted in the first cavity 4 to flow together with the first product P1 in the second cavity 5 and join with the second product P2 to obtain a final product PF.

The first container 2 and the second container 3 are compressible and/or crushable respectively to allow transferring the fluid F and the first product P1 from the first cavity 4 to the second cavity 5 and to allow the final product PF exiting the second cavity 5.

In particular, the first container 2 comprises a first deformable and/or compressible casing 20 provided with a first flange-shaped edge 27, to which the first interface element 6 is fixed; the second container 3 comprises a second casing 30, also deformable and/or compressible, provided with a second flange-shaped edge 37, to which the second interface element 7 is fixed. The first edge 27 forms an annular seat 27a receiving a peripheral edge of the first interface element 6 that can be fixed thereto by welding or gluing, or by interference fit. Similarly, the second edge 37 forms an annular seat 37a receiving a peripheral edge of the second interface element 7 that can be fixed thereto by welding or gluing, or by interference fit.

The first connecting device 11 includes a first conduit 13 and the second connecting device 12 includes a second conduit 14. In the assembled configuration B of the capsule 1, the first connecting device 11 engages with and connects to the second connecting device 12 to couple the first conduit 13 to the second conduit 14 and to establish a flow connection between the first cavity 4 and the second cavity 5 allowing a fluid F inserted into the first cavity 4 to flow together with the first product P1 into the second cavity 5 and join with the second product P2 to make a final product PF.

Each interface element 6, 7 includes a respective element of a substantially flat shape, for example, disc-shaped, optionally provided with one or more through openings to allow the insertion of the initial products P1, P2 into the cavities 4, 5 of the containers, in a filling step of the latter ones.

The interface elements 6, 7 are made of a plastic material and fixed, for example by thermal or ultrasonic welding, to the respective edges 27, 37 of the containers 2, 3.

The first casing 20 and the second casing 30 are obtained by forming of a thermoformable material sheet, in particular a liquid- and gas-impermeable multilayered plastic material and suitable to the contact with food.

The first connecting device includes at least one connecting protrusion 11 arranged to engage in a respective housing 12 of the second connecting device. The first conduit includes a first conduit 13 arranged in the connecting protrusion 15 and the second conduit includes a second conduit 14 arranged in the housing 12. In the embodiment illustrated in the Figures by way of non-limiting example, the first connecting device includes four connecting protrusions 11 spaced apart from one another and arranged to engage in the assembled configuration B with respective housings 12 of the second connecting device. In such a manner, the first passage conduits 13 and the second passage conduits 14 make four distinct connection conduits for the passage of the fluid F and of the first product P1 and/or the air outflow, as better explained below.

In a version of the capsule not illustrated in the Figures, the first connecting device includes at least one housing receiving and engaging with a respective protrusion of the second connecting device.

The first container 2 includes a third interface element 8 fixed to a third peripheral edge 28 of the first casing 20 and substantially opposite the first interface element 6. The third interface element 8 includes at least a supply hole 29 engaged by an injecting device 61 of the dispensing machine 60 to allow the introduction of the fluid F in the first cavity 4. A first nozzle 25 is fixed to the third interface element 8 so that the respective internal conduit is connected to the supply hole 29. The first nozzle 25 allows dispensing of the fluid F in a uniform and even manner on the first product P1.

With reference to the embodiment illustrated in the Figures, the first casing 20 comprises a first side wall 24 having a substantially tubular shape, ending at an end with the first peripheral edge 27, to which the first interface element 6 is connected, and at the opposite end with the third peripheral edge 28, to which the third interface element 8 is connected.

The first side wall 24, the first interface element 6, and the third interface element substantially define the first cavity 4.

The first side wall 24 is convergent starting from the first peripheral edge 27 up to the third peripheral edge 28.

In a non-illustrated version of the capsule 1, the first container 2 does not include the third interface element, and the first casing 20 includes, beside the first side wall, a first base wall forming the first cavity 4 with the above-mentioned first side wall. In this version, the first base wall is perforable by the injecting device of the dispensing machine for the introduction of the fluid F.

The second casing 30 comprises a second side wall 34 and a second base wall 33 defining the second cavity 5. The second side wall 34 with a substantially tubular shape ends at an end with the second peripheral edge 37, opposite the second base wall 33 and to which the second interface element 7 is connected. The second side wall 34 is convergent starting from the second peripheral edge 37 up to the second base wall 33.

The first side wall 24 and the second side wall 34 are deformable and/or compressible to allow the first casing 20 and the second casing 30, respectively, to be compressed and crushed along a direction A that is transverse, in particular substantially orthogonal, to the interface elements 6, 7. To this aim, the above-mentioned side walls 24, 34 are obtained in the shape of an accordion or in the shape of a bellows, or they are provided with yielding lines.

In particular, as better explained in the following of the description, the first side wall 24 is deformable and/or compressible to allow the first casing 20 to be compressed and/or crushed along the direction A, so as to transfer the fluid F and the first product P1 (typically already combined to form an intermediate product P3) from said first cavity 4 to said second cavity 5. Similarly, the second side wall 34 is deformable and/or compressible to allow the second casing 30 to be compressed and/or crushed along the direction A so as to make the final product PF to exit from the second cavity 5, and then from the capsule 1. A first covering element 18 substantially superimposes the first interface element 6, fixed to the first peripheral edge 27 of the first casing 20 so as to hermetically closing the first cavity 4. Similarly, a second covering element 19 substantially superimposes the second interface element 7, fixed to the second peripheral edge 37 of the second casing 30 so as to hermetically closing the second cavity 5.

A third covering element 22 is further provided substantially superimposing the third interface element 8, fixed to the third peripheral edge 28 of the first casing 20 to close said first cavity 4 in cooperation with said first covering element 18.

The first covering element 18 and the second covering element 19 include films that are easily perforable by the first connecting device 11 and/or the second connecting device 12 when mutually engaged in the assembled configuration B of the capsule.

The third covering element 22 also includes a respective aluminum or plastic film, which is perforable by the injecting device 61 of the dispensing machine 60.

In particular, the covering elements 18, 19, 22 can be obtained with a multilayered film comprising, for example, a layer formed by an airtight plastic film and a second layer formed by a peelable aluminum film. The aluminium film separates and protects the underlying plastic film against the external environment. Just before use, the aluminium film can be removed in such a manner as to uncover the underlying plastic film to be perforated, which remained clean and aseptic. In this manner, the hygiene and cleanliness during the connection between the two containers 2, 3 are ensured.

Each connecting protrusion 11 comprises a sharp end capable of easily perforating and/or tearing the first covering element 18 and the second covering element 19, as illustrated in particular in FIG. 3.

Alternatively, the first covering element 18 and the second covering element 19 can be removably fixed to the first casing 20 and the second casing 30, respectively, for example by peelable weldings. In this manner, it is possible for a user to easily remove and detach the above-mentioned covering elements 18, 19 from the respective containers 2, 3 before connecting the latter ones in the assembled configuration B of the capsule to allow the first connecting device 11 and the second connecting device 12 to engage with each other. In this case, the first connecting device 11 and the second connecting device 12 do not perforate and/or tear the covering elements 18, 19.

The second container 3 includes an opening promoting device 39, 40 arranged to make an outlet for the final product PF when the second container 3 is compressed and/or crushed.

In the illustrated embodiment, the opening promoting device includes an outlet hole 39 in the second base wall 33 of the second casing 30 of the second container 3 and hermetically closed by a closing element 40, the latter being externally fixed to the second base wall 33 and detachable or tearable by the action of the thrust or pressure of the final product PF when the second container 3 is compressed and crushed.

The closing element 40 comprises, for example, an aluminium or plastic material label fixed, in particular glued, to the second base wall 33.

The closing element 40 may include an extended strip intended to be locked by an abutting device 64 of the dispensing machine 60, so as to prevent the above-mentioned closing element 40 from completely detaching and falling in an underlying consumption container when opening the capsule 1 and dispensing the beverage (FIG. 7).

Alternatively, the opening promoting device may include at least one pre-incision line or a weakening portion, obtained on the second base wall 33 and frangible by the action of the thrust or pressure of the final product PF when the second container 3 is compressed and crushed.

The second container 3 further comprises at least one second nozzle 16 fixed to the second interface element 7 and arranged to dispense into the second cavity 5 the fluid F and the first product P1 coming from the first cavity 4, i.e., the intermediate product P3 obtained from the combination of the fluid F with the first product P1. Such an intermediate product P3 can be, for example, a flavoring substance to be joined to the second product P2 to obtain a flavored final product PF.

In particular, the second nozzle 16 is fixed to the second interface element 7 so that a respective internal conduit 16a thereof is in flow connection with the second conduit 14. More precisely, the second nozzle 16 is fixed to the second interface element 7 at a housing 12 of the latter so that its internal conduit 16a flows into the second conduit 14 of the housing.

The nozzle 16 comprises at least one respective introduction opening obtained on, or in the proximity of, the end and shaped to direct a respective fluid jet F downwardly in the direction of the second base wall 33, and optionally a plurality of further introduction openings obtained on a side wall of said nozzle and adjacent to the end.

In the illustrated embodiment, the second nozzle 16 comprises a rigid tubular element, made for example of plastic material, having such a length as to come out from the second cavity 5 through the opening 39 when said second casing 30 is compressed and crushed.

The nozzle can be provided with a sharp end capable of detaching or tearing the closing element 40 or perforating the second base wall 33 at the pre-incision line or weakening portion obtained on the second base wall 33.

In a version of the capsule not illustrated in the Figures, the second nozzle can have a minimum length and such as to remain completely inside the second container 2 when the latter is completely crushed and compressed.

In the illustrated embodiment, the second container 3 includes one or more further second nozzles 17, for example two identical second nozzles, also fixed to the second interface element 7 and arranged for introducing in the second cavity 5 the fluid F joined to the first product P1, i.e., the intermediate product P3. The further second nozzles 17 are fixed to the second interface element 7 so that the respective internal conduits 17a are in flow connection with the second conduit 14. More precisely, each further second nozzle 17 is fixed to the second interface element 7 at a respective housing 12 so that its internal conduit 17a flows into the second conduit 14 of the housing.

The further second nozzles 17 are arranged substantially parallel to the second nozzle 16 and placed side by side to the opposite sides of the latter so as to approach with respective end portions to the second side wall 34 and to the second base wall 33. The further second nozzles 17 are conformed so as to direct respective fluid jets towards the second side wall 34, in particular with a substantially tangential direction, so as to create a vortical flow or vortex.

The combination of the fluid jets F dispensed by the second nozzle 16 and by the further second nozzles 17 allows solubilizing and dissolving completely and homogeneously, without manual intervention of a user, also products that are not very or that are slowly soluble and/or containing thickening agents and stabilizers, or freeze-dried or dehydrated products, so as to obtained dense or viscous final products (for example, beverages such as liquid chocolates) perfectly dissolved and free from clots and lumps. To this aim, the injected fluid pressure and temperature have to be suitably adjusted in function of the type and composition of the initial products.

To allow the second container to be compressed and/or crushed so as to reduce an initial volume thereof, the further second nozzles 17, unlike the second nozzle 16, are deformable and/or compressible. In particular, each further second nozzle 17 comprises a corrugated or bellows-like tubular wall that can be easily compressed and/or folded and deformed, as illustrated in FIG. 7.

It shall be noticed that one of the four connecting protrusions 11 of the first interface element 6 engages with a respective housing 12 of the second interface element 7 so that the respective passage conduits 13, 14 form a conduit for the air outflow.

In a non-illustrated version of the capsule 1, the second container 2 includes only one second nozzle 16. In this case, the connecting device 11 of the first interface element 6 includes only one pair of connecting protrusions intended to engage with respective housings 12 to provide a conduit for the passage of the intermediate product P3 and a conduit for the air outflow, respectively.

The use of the capsule 1 of the invention provides, in an initial step, the connection of the two containers 2, 3 in the assembled configuration B by bringing the first interface element 6 to engage with and connect to the second interface element 7, to obtain the above-mentioned capsule 1. In particular, the connecting protrusions 11 of the first connecting device are sealingly inserted in the housings 12 of the second connecting device, thus obtaining, by joining the first passage conduits 13 of the above-mentioned connecting protrusions 11 to the second passage conduits 14 of the above-mentioned housings 12, passages for the flow of the fluid F and the first product P1 from the first cavity 4 to the second cavity 5 and in the opposite direction for the passage of air from the second cavity 5 to the first cavity 4. During the connection, the connecting protrusions 11 tear the covering elements 18, 19.

In a first operating step F1, the fluid F is delivered inside the first cavity 4 through the first nozzle 25 of the third interface element so that it can join to and/or combine with the first product P1 and form an intermediate product P3 (FIG. 5). The air that is present in the first cavity 4 can exit through the vent hole 26.

In a second operating step F2, the first casing 20 of the first container 2 is progressively compressed and crushed so as to reduce the initial volume thereof and to force the intermediate beverage P3 to flow from the first cavity 4 into the second cavity 5 by virtue of the first and second connecting device 11, 12 of the interface elements 6, 7. In this step, the vent hole 26 is closed.

The intermediate product P3 inserted in the second cavity 5 through the second nozzles 16, 17 joins to and/or mixes with the second intermediate product P2 so as to form the final product PF (FIG. 6). The air that is present in the second cavity 5 can flow into the first cavity 4 through the connecting device 11, 12.

In this second operating step F2, it can be provided the further introduction of fluid F in the first container 2 and then in the second container 3 to dilute the final product PF to the required concentration.

In a third operating step F3, the second casing 30 of the second container 3 is also crushed so as to reduce the initial volume thereof (FIG. 7). The opening promoting device 39, 40, by virtue of the thrust of the final product PF, opens the second container 3 and permits the outflow of the final product PF.

Also during the third operating step F3, it can be provided the further introduction of fluid F directly in the consumption container through the second nozzle 16 to dilute the final product PF to the required concentration.

It is suitable to note that the user, by combining the first container 2 with the second container 3 as required, both the containers 2, 3 being available in different ranges and types of first product P1 and second product P2, respectively, can assemble a capsule 1 with which any desired mixed or combined final product PF can be obtained, for example, a flavored beverage.

Therefore, owing to the capsule 1 of the invention, it is not necessary to have a wide range of different capsules to meet tastes and requirements of the consumers, since with a reduced number of different first and second containers (and respective initial products), it is possible to obtain a high number of combinations and therefore a wide selection. This allows reducing the purchasing costs and the space to receive and store the capsules. Furthermore, the capsule 1 structure allows preparing in an optimal manner the final product, in fact, providing for the preparation in a first step of an intermediate product, for example, a flavoring substance or component, to be added in a second step to the second product (main product to be flavored) to obtain the desired final beverage.

The connecting device 11, 12 and the nozzles 25, 16, 17 allow optimal automatic mixing of the fluid F and the initial products P1, P2 without manual intervention by the user.

The proper preparation sequence and hygiene of the process (sealed containers) allow obtaining a final product with high organoleptic and hygienic characteristics.

FIGS. 4 to 6 further schematically illustrate the dispensing machine 60 according to the invention, arranged to receive the capsule 1 described above.

Such a machine includes a support 62 suitable receive and to support the capsule 1 in the assembled configuration B, i.e., with the first container 2 connected to the second container 3.

The support 62 includes, for example, a support plate fixed to the machine frame, provided with a through opening around which a seat 62a is present, arranged to receive and support the second peripheral edge 37 of the second container 3.

The machine further includes a first abutting device 63 that is movable along the direction A to compress and crush the first container 2 against the support 62, and a second abutting device 64 that is movable along the direction A to compress and crush the second container 3 against the support 62. In particular, the downwardly mobile first abutting device 63 compresses and crushes the first container 2, thus reducing an internal volume thereof to allow the fluid F flowing together with the first product P1 in the second container 3 to join to the second product P2 and to obtain a final product PF. The second abutting device 64 moves upwardly in the opposite direction and compresses and crushes the second container 3 against the support 62, thus reducing an internal volume thereof to allow opening of the second container 3 and exiting of the final product PF.

The direction A is substantially vertical and almost orthogonal to a second base wall 33 of the second container 3.

The first abutting device 63 includes, for example, an annular plate capable of abutting against the first container 2 at the third peripheral edge 28. The first abutting device 63 is actuated by a first moving device 65, of a known type and schematically illustrated in the Figures, which is controlled by a control unit of the dispensing machine 60, according to the methods described herein below.

Similarly, the second abutting device 64 includes, for example, a plate provided with a central hole for the exit of the final product PF, capable of abutting against the second container 3 at the second base wall 33. The second abutting device 64 is actuated by a second moving device 66, of a known type and schematically illustrated in the Figures, which is controlled by the control unit of the dispensing machine 60.

The machine 60 is further provided with an injecting device 61 arranged to dispense the fluid F in the first container 2. The injecting device 61 is fixed to, and supported by, the first abutting device 63. Alternatively, the injecting device can be mounted on further independent moving device.

The injecting device 61 includes a first needle 68 and a second needle 69 arranged to perforate the third covering element 22 and to sealingly engage the supply hole 29 and the vent hole 26 of the third interface element 8, respectively.

It shall be noticed that, in this manner, the injecting device 61 of the dispensing machine 60 does not come in contact with the product P1 and/or with the mixture/beverage in the preparation step and, subsequently, in the dispensing step. In other words, a supply system of the machine that includes the injecting device 61 is not dirtied or polluted by the product and/or the beverage, thus ensuring the hygiene of the dispensing process and the quality of the beverages at each dispensing operation, and preserving the organoleptic properties thereof.

Similarly, it is suitable to note that the capsule 1 for beverages of the invention can be used on a dispensing machine 60 that is not provided with a dispensing system, since such a capsule does not require a withdrawal element suitable to perforate the bottom thereof to allow the exit of the beverage, nor a conduit to convey the beverage to the consumption container (for example, a cup, a small cup, a glass, etc.).

The absence of the dispensing system makes the machine more simple and inexpensive, and it further ensures the hygiene of the dispensing process and the conservation of the quality of the dispensed beverages, since contaminations between beverages dispensed in successive times are impossible.

The injecting device 61 is connected to a supply system, of a known type and not illustrated in the Figures. Such a supply system includes at least one boiler to heat the fluid F, and a pump to deliver the pressurized fluid to the injecting device 61.

The first abutting device 63 is movable along the direction A between different and successive operating positions.

In an initial operating position S1, the first abutting device 63 is spaced apart from the support 62 to allow the insertion of the capsule 1 on to the support (FIG. 4 in dotted line). In an intermediate operating position S2, the first abutting device 63 abuts against the first container 2 and allows the injecting device 61 engaging with, or alternatively directly inserting in, the first container 2 to introduce the fluid F.

In a final operating position S3, the first abutting device has compressed and crushed the first container 2 against the support 62, thus reducing the volume thereof so as to combine the fluid F with the first product P1 which exits the first cavity 4 as intermediate product P3.

Similarly, the second abutting device 64 is movable along the direction A between different and successive operating positions.

In a further initial position S4, the second abutting device 64 is spaced apart from the support 62 to allow the insertion of the capsule 1 on to the support 62.

In a further intermediate operating position S5, the second abutting device 64 abuts against the second container 3, and in particular a second base wall 33 of the latter.

In a further final operating position S6, the second abutting device 64 has compressed and crushed against the support 62 the second container 3, thus reducing the volume thereof to open the latter and to allow the final product PF to exit.

The operating positions of the first abutting device 63 and of the second abutting device 64, in particular, the intermediate operating positions S2, S4 and the final operating positions S3, S6 can be set by the control unit of the dispensing machine as a function of the size of the capsule 1 stored in the above-mentioned control unit.

The dispensing machine 60 of the invention is thus capable of receiving and using a plurality of capsules 1 having different sizes and/or initial products to automatically obtain respective final products. In particular, the machine 60 allows making automatically and without intervention by the user a desired final product, mixed or combined, for example a flavored beverage, by preparing, in a first step, an intermediate product P3, for example a flavoring substance or component (by combining the fluid F to the first product P1 in the first container 2), then adding, in a second step, said intermediate product P3 to the second product P2 (main product to be flavored) to obtain the desired final beverage B.

The proper preparation sequence and the hygiene of the process (sealed containers) allow production of a final product with high organoleptic and hygienic characteristics. In fact, the hygiene is ensured by the contents of the capsule not coming into direct contact with the consumption container. Similarly, the injecting device 61 does not come into contact with the product P1 and/or with the mixture/beverage in the preparation step and, subsequently, in the dispensing step.

FIG. 8 illustrates a version of the capsule 1 of the invention differing from the embodiment described above in that the second container 3 comprises, besides the second nozzle 16, a pair of further second nozzles 47 shorter than the second nozzle 16, mutually identical, fixed to the second interface element 7 and arranged to introduce in the second cavity 5 the fluid F joined to the first product P1.

Such a version of the capsule 1, like the capsule set forth in the FIGS. 1 to 7, can be used directly by a user without the need of using the dispensing machine.

After the connection of the two containers 2, 3 in the assembled configuration B (bringing the first interface element 6 to engage with and connect to the second interface element 7, thus obtaining passages between the first cavity 4 and the second cavity 5) the user can perforate, in a first operating step, with a syringe 71, or other similar injecting device, the third covering element 22 and inject through the hole 19 of the third interface element 8 the fluid F in the first cavity 4 of the first container 2.

In a second operating step, by manually crushing and compressing the first container 2, thus reducing an internal volume thereof, the user forces the fluid F and the first product P1 to flow in the second container 3 to join to the second product P2 and to obtain a final product PF. The mixing between the initial products P1, P2 and the fluid F can be promoted by manually stirring the capsule 1.

In a third operating step, by manually crushing and compressing the second container 3 and reducing an internal volume thereof, the user obtains the opening thereof and the outflow of the final product PF.

The capsule 1 used manually is in particular suitable for pharmaceutical products, for example, syrups, suspensions, and the like.

With reference to FIG. 9, another version of the capsule 1 is illustrated, differing from the embodiments illustrated above in the different structure of the first container 2 and the second container 3.

In fact, the first container 2 comprises a deformable and/or compressible first casing 120 provided with a flange-shaped first edge 127 to which the first interface element 6 is fixed, a first side wall 124 having a substantially tubular shape, ending at an end with the above-mentioned first peripheral edge 27 and a first base wall 128 connected to the first side wall 124 and opposite the first interface element 6. The first side wall 124 and the first base wall 128 form the first cavity 4.

The first side wall 124 is converging starting from the first peripheral edge 127 to the first base wall 128. The first side wall 124 is further deformable and/or compressible to allow the first casing 120 to be compressed and crushed along a direction A. To this aim, the first side wall 124 is obtained in the shape of an accordion or in the shape of a bellows, or it is provided with yielding lines.

The second container 3 comprises a second casing 130 that is not deformable and provided with a flange-shaped second edge 137 to which the second interface element 7 is fixed, a second side wall 134 having a substantially tubular shape, ending at an end with the above-mentioned second peripheral edge 137 and a second base wall 133 connected to the second side wall 134 and opposite the second interface element 7. The second side wall 134 and the second base wall 133 form the second cavity 5. The second container 3 comprises a plurality of further nozzles 116 mutually identical, fixed to the second interface element 7 and arranged to deliver a first product P1' in the second cavity 5.

Alternatively, the second container 3 can be not provided with nozzles, the second interface element 7 comprising one or more holes or openings for the passage of the first product P1.

The use of such a capsule 1 is different from that of the previous different capsules, since it requires a manual use by the user and it does not provide for the compression and/or crushing of the second container 3 to obtain the exit of the final product.

The first container 2 contains a first product P1', for example, in liquid form, intended to be joined to a second product P2 contained in the second container 3 to obtain a final product.

After the connection of the two containers 2, 3 in the assembled configuration B (bringing the first interface element 6 to engage with and connect to the second interface element 7, thus obtaining passages between the first cavity 4 and the second cavity 5), the user, in a first operating step, manually crushes and compresses the first container 2, thus reducing an internal volume thereof, and forcing the first product P1' to flow in the second container 3 to join to the second product P2 and to obtain a final product. The mixing between the initial products P1', P2 can be promoted also by manual stirring of the capsule 1. In particular, the first liquid product P1' dissolves or solubilizes or suspends the second product P2.

In a second operating step, once the final product has been obtained, the user can separate the two containers 2 and 3 (by disengaging the first interface element 6 and the second interface element 7 one from the other) and directly access the second cavity 5 to use the final product contained therein. To this aim, the second container 3 can directly act as a consumption container, or its content, i.e., the final product, can be poured in a suitable consumption container.

In fact, the second interface element 7 includes a respective element having a substantially flat shape, provided with one or more through openings to allow both the insertion of the second product in the second cavity 5 and the exit of the final product.

Therefore, owing to the capsule 1 of the invention, it is possible to manually combine in a simple and rapid manner, at the time of use, two initial products, thus ensuring the integrity and hygiene thereof. In fact, the first product and the second product are joined and/or combined without coming anyhow in contact with elements or materials external to the capsule, which may dirty or contaminate or pollute the above-mentioned initial products and/or final product.

The final product is further obtained by combining accurate and calibrated amounts of the initial products.

The capsule, especially in the pharmaceutical field, and in the case of products in a freeze-dried or powdery form (second initial product) that have to be rehydrated or solubilized, or anyhow combined with a liquid (first initial product) before the administration, allows avoiding dosing errors while simplifying the entire manual procedure for the preparation thereof.

Such a capsule can then be easily and comfortably used also by not very skilled and handy users.

The invention claimed is:

1. A capsule, comprising a first container provided with a first closed cavity containing a first product and a second container provided with a second closed cavity containing a second product, said first container and said second container having, respectively, a first casing provided with a flange-shaped first peripheral edge to which a first interface element is connected and a second casing provided with a flange-shaped second peripheral edge to which a second interface element is connected, the first interface element facing said first cavity and the second interface element facing said second cavity, respectively, wherein said first interface element is provided with a first connecting device having a first conduit assembly and said second interface element is provided with a second connecting device having a second conduit assembly, wherein in an assembled configuration of said capsule in which said first container is associated with said second container, said first connecting device is engaged with said second connecting device to couple said first conduit assembly with said second conduit assembly to establish a flow connection between said first cavity and said second cavity, at least one nozzle fixed to said second interface element and arranged for dispensing at least said first product coming from said first cavity into said second cavity to enable said first product to join said second product to make a final product.

2. Capsule according to claim 1, wherein said first connecting device comprises at least a first protrusion for engaging a first housing of said second connecting device, said first conduit assembly comprising a first conduit in said first protrusion and said second conduit assembly comprising a second conduit in said first housing.

3. A capsule according to claim 1, wherein said first container comprises a first covering element substantially superimposed on said first interface element and arranged for hermetically closing said first cavity, and said second container comprises a second covering element substantially superimposed on said second interface element and arranged for hermetically closing said second cavity, said first covering element and said second covering element being perforable by said first connecting device and/or by said second connecting device when said first connecting device and said second connecting device are mutually engaged in said assembled configuration.

4. A capsule according to claim 1, wherein said first container comprises a first covering element substantially superimposed on said first interface element and arranged for hermetically closing said first cavity, and said second container comprises a second covering element substantially superimposed on said second interface element and arranged for hermetically closing said second cavity, said first covering element and said second covering element being removable and detachable, respectively, from said first container and from said second container for enabling said first connecting device and said second connecting device to engage in said assembled configuration.

5. A capsule according to claim 1, wherein said nozzle is fixed to said second interface element so that an internal conduit of said nozzle is connected to said second conduit assembly.

6. A capsule according to claim 1, wherein said first container is compressible and/or crushable for enabling at least said first product to be transferred from said first cavity to said second cavity.

7. A capsule according to claim 6, wherein said first casing is provided with a first side wall that is deformable and/or compressible to enable said first casing to be compressed and/or crushed along a direction that is transverse to said first interface element.

8. A capsule according to claim 1, wherein said second container is compressible and/or crushable for enabling said final product to exit from said second cavity.

9. Capsule according to claim 8, wherein said second casing is provided with a second side wall that is deformable and/or compressible to enable said second casing to be compressed and/or crushed along a direction that is transverse to said second interface element.

10. A capsule according to claim 8, wherein said second container comprises an opening promoting device for making an outlet for said final product when said second container is compressed and/or crushed.

11. A capsule according to claim 9, wherein the first casing is Provided with a first side wall that is connected to said flange-shaped first peripheral edge and that is deformable and/or compressible to enable said first casing to be compressed and/or crushed along a direction that is transverse to said first interface element, and wherein said second peripheral edge is connected to said second side wall.

12. A capsule according to claim 1, wherein at least one of said first container and said second container are perforable for enabling a fluid to be delivered and joined to at least one of said first product and said second product for enabling said final product to exit.

13. A capsule according to claim 1, wherein said first container comprises a third interface element fixed to a third peripheral edge of the first casing of said first container and opposite said first interface element, said third interface element comprising at least one supply hole that is engageable by an injecting device suitable for dispensing a fluid to be joined to said first product into said first cavity.

14. A capsule according to claim 13, wherein said first container comprises a third covering element substantially superimposed on said third interface element and arranged for hermetically closing said first cavity, said third covering element being perforable by said injecting device.

* * * * *